US012493330B2

(12) United States Patent
Sun et al.

(10) Patent No.: US 12,493,330 B2
(45) Date of Patent: Dec. 9, 2025

(54) CABLING STRUCTURE OF FOLDABLE ELECTRONIC DEVICE

(71) Applicant: Acer Incorporated, New Taipei (TW)

(72) Inventors: Hui-Ping Sun, New Taipei (TW); Jui-Yi Yu, New Taipei (TW); Chun-Hung Wen, New Taipei (TW); Yen-Chou Chueh, New Taipei (TW); Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 284 days.

(21) Appl. No.: 18/313,378

(22) Filed: May 8, 2023

(65) Prior Publication Data

US 2024/0111339 A1 Apr. 4, 2024

(30) Foreign Application Priority Data

Oct. 4, 2022 (TW) .................................. 111137730

(51) Int. Cl.
*G06F 1/16* (2006.01)
(52) U.S. Cl.
CPC .......... *G06F 1/1679* (2013.01); *G06F 1/1618* (2013.01); *G06F 1/1624* (2013.01); *G06F 1/1683* (2013.01)
(58) Field of Classification Search
CPC ............. G06F 1/16–3296; H04M 1/026–0277
USPC .............................................. 361/679.27–28
See application file for complete search history.

(56) References Cited

U.S. PATENT DOCUMENTS

| 8,780,544 | B2 * | 7/2014 | Liang | G06F 1/1683 |
| | | | | 361/679.28 |
| 8,964,377 | B2 * | 2/2015 | Choi | H04M 1/0237 |
| | | | | 361/679.55 |
| 11,158,447 | B2 * | 10/2021 | Luo | G06F 1/1658 |
| 11,287,855 | B2 * | 3/2022 | Kim | G06F 1/1656 |
| 11,812,570 | B1 * | 11/2023 | Lin | H04M 1/0274 |
| 2013/0255995 | A1 * | 10/2013 | Mai | H05K 9/0022 |
| | | | | 174/136 |

* cited by examiner

*Primary Examiner* — Anthony M Haughton
*Assistant Examiner* — Ross Terry Mularski
(74) *Attorney, Agent, or Firm* — JCIPRNET

(57) ABSTRACT

A cabling structure of a foldable electronic device includes a first body, a second body, a hinge module connecting the first body and the second body, a sliding member movably disposed in the second body, a flexible electrical connecting member connected to the first body, the second body, and the sliding member and being driven when the first body and the second body are rotated relatively, and a restoring module disposed in the second body and providing a force to the sliding member. The first body and the second body are rotated relatively to each other through the hinge module. When being rotated relatively to each other, the first body and the second body drive the flexible electrical connecting member and the sliding member. The restoring module restores the sliding member and the flexible electrical connecting member via the force.

8 Claims, 12 Drawing Sheets

CABLING STRUCTURE OF FOLDABLE ELECTRONIC DEVICE

CROSS-REFERENCE TO RELATED APPLICATION

This application claims the priority benefit of Taiwan application serial no. 111137730, filed on Oct. 4, 2022. The entirety of the above-mentioned patent application is hereby incorporated by reference herein and made a part of this specification.

BACKGROUND

Technical Field

The disclosure relates to a cabling structure, and in particular, to a cabling structure of a foldable electronic device.

Description of Related Art

Generally speaking, a common mechanism design of a foldable electronic device, such as a notebook computer, is to assemble a display screen and a host device with a hinge. At the same time, in practical applications, in order to further reduce the space occupied by the circuit cabling inside the foldable electronic device, the cabling space in the hinge is usually used for disposing the circuit cabling.

However, the cabling space in the hinge will have different contour sections along with the pivoting between the hinge, the screen, and the host. Therefore, the circuit cabling passing through the cabling space are often squeezed or even broken due to the reduction of the cabling space, which affects the service life of the circuit cabling of the foldable electronic device and the reliability of the product. In addition, with the development trend of the foldable electronic device toward a thin and light appearance, it has become more difficult to dispose a cabling space in the hinge, and even by taking into consideration the rigidity of the hinge, it is necessary to materialize all parts of the internal space that are not torsion components, thereby completely eliminating the possibility of the cabling space.

Based on the above, how a new technical solution may be provided to overcome the problems for the cabling space of the foldable electronic device is an important issue that relevant technical personnel should contemplate.

SUMMARY

The disclosure provides a cabling structure of a foldable electronic device, which restores the flexible electrical connecting member via a sliding member and a restoring module, so as to effectively protect the flexible electrical connecting member.

A cabling structure of a foldable electronic device includes a first body, a second body, a hinge module connecting the first body and the second body, a sliding member movably disposed in the second body, a flexible electrical connecting member connecting the first body, the second body, and the sliding member to be driven when the first body and the second body are rotated relatively, and a restoring module disposed in the second body and providing a force to the sliding member. The first body and the second body are rotated relatively to each other through the hinge module. When being rotated relatively to each other, the first body and the second body drive the flexible electrical connecting member and the sliding member. The restoring module restores the sliding member and the flexible electrical connecting member via the force.

Based on the above, through the pairing of the flexible electrical connecting member with the sliding member and the restoring module, the foldable electronic device provides the flexible electrical connecting member with a reverse balance force during stretching, so that the flexible electrical connecting member may be restored after being stretched. Further, a part of the flexible electrical connecting member connects the first body, the second body, and the sliding member, respectively, so that when the first body and the second body are rotated relatively to each other, the flexible electrical connecting member is driven together to stretch out of the body. At this time, in order to prevent the flexible electrical connecting member from being incapable of being retracted into the body after being stretched, the sliding member and the restoring module are used. Accordingly, when not under the force, the part of the flexible electrical connecting member remaining outside the body may be retracted into the body by the sliding member and the restoring structure, so as to avoid the situation of the part being remained outside and clamped by the body.

DESCRIPTION OF THE EMBODIMENTS

Figure 1:
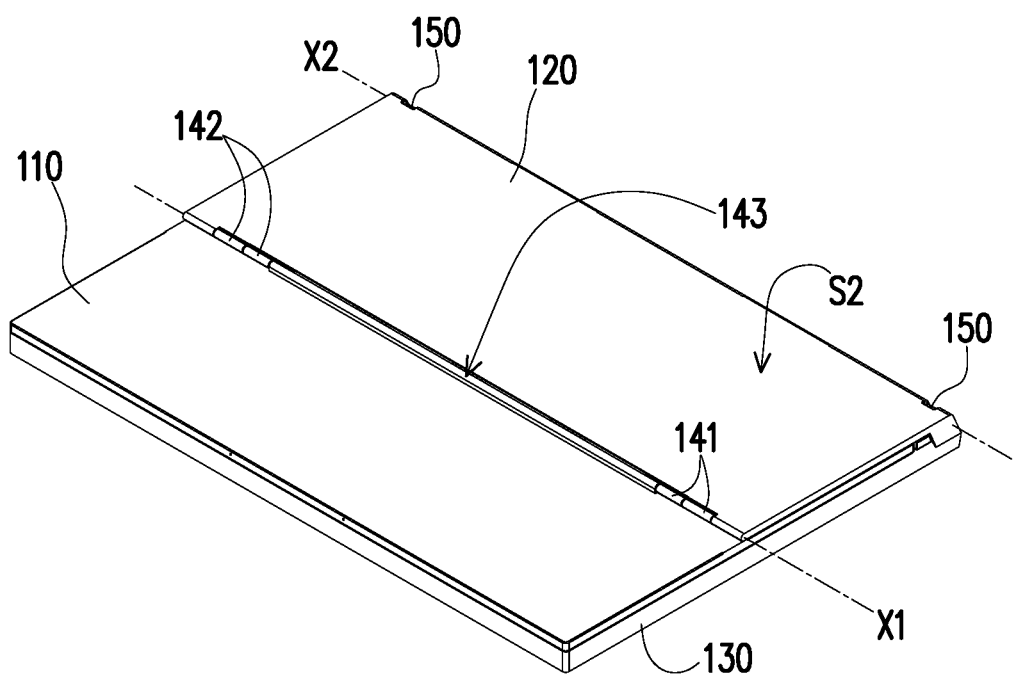
FIG. 1 is a schematic view of a foldable electronic device according to an embodiment of the disclosure.
Figure 2A:
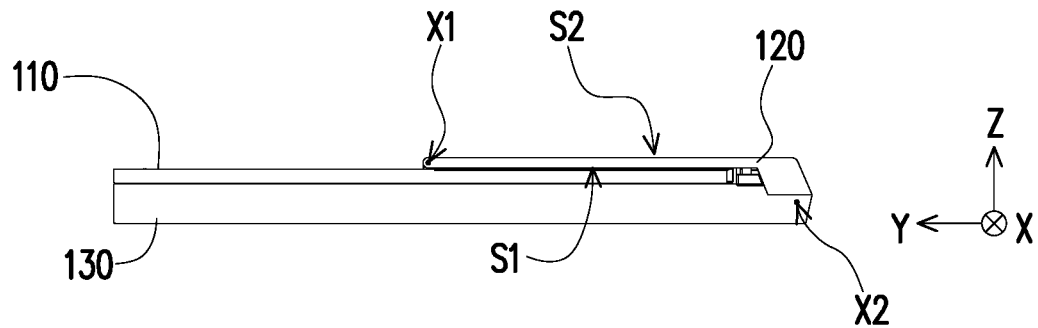
FIG. 2A to FIG. 2C are side views of the foldable electronic device of FIG. 1 in different states.
Figure 2B:
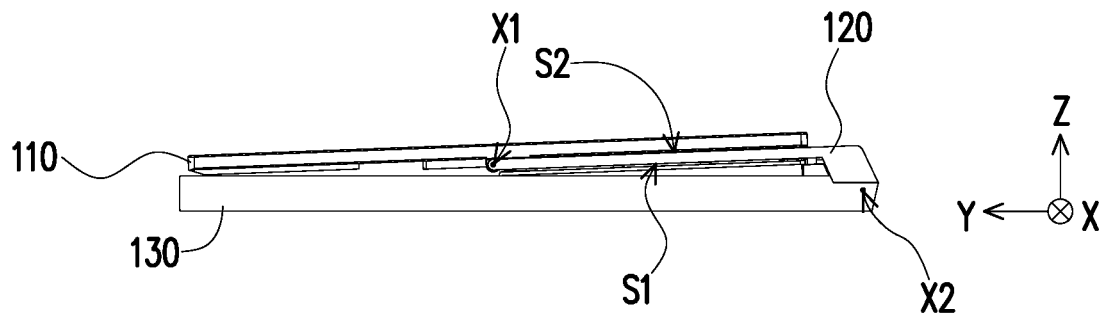
Figure 2C:
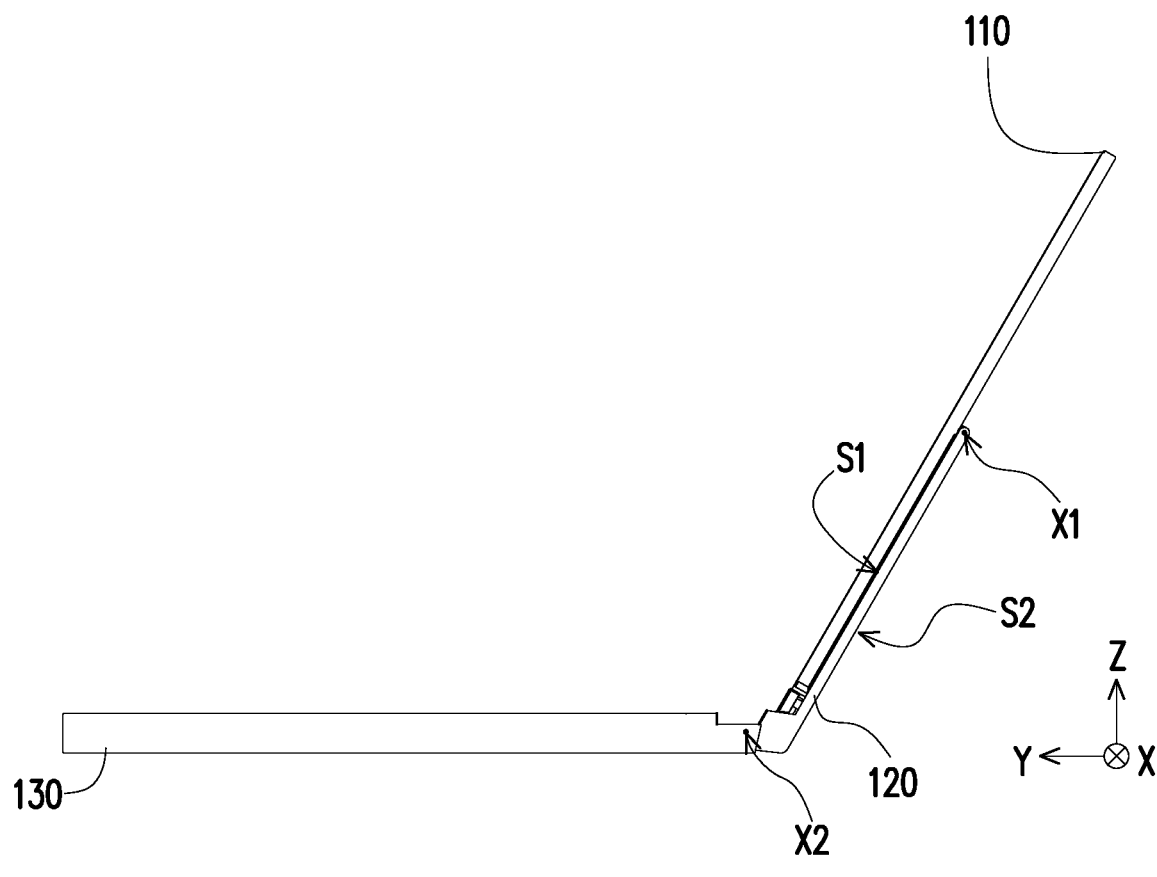

FIG. 1 is a schematic view of a foldable electronic device according to an embodiment of the disclosure. FIG. 2A to FIG. 2C are side views of the foldable electronic device of FIG. 1 in different states. Here, the state shown in FIG. 1 directly corresponds to FIG. 2A, and rectangular coordinates X-Y-Z are provided to facilitate the description of the components. Please refer to FIG. 1 and FIG. 2A to FIG. 2C at the same time. In the embodiment, the foldable electronic device 100, taking a notebook computer as an example, includes a first body 110, a second body 120, a third body 130, a hinge module 140, and a hinge module 150. The first body 110 is, for example, a display screen. The second body 120 is, for example, a support arm. The hinge module 140 connects the first body 110 and the second body 120 so that the first body 110 and the second body 120 are rotated relatively to each other along the axis X1 through the hinge module 140 to be opened or closed. Furthermore, the third body 130 is, for example, a host of a notebook computer. The hinge module 150 connects the second body 120 and the third body 130 so that the second body 120 and the third body 130 are rotated relatively to each other along the axis X2 through the hinge module 150 to be opened or closed.

Based on the above component configuration, the foldable electronic device 100 may be converted between the different states as shown in FIG. 2A to FIG. 2C, for example, from the fully closed state shown in FIG. 2A to the notebook mode shown in FIG. 2C. Then, the first body 110 is flipped from a surface S1 of the second body 120 to a surface S2 through the hinge module 140. Then the second body 120 and the first body 110 are stacked back on the third body 130 through the hinge module 140 to be in a plate-like state. Here, only a part of the state is used as an example to facilitate subsequent descriptions, but the foldable electronic device 100 of the embodiment is not limited hereto. At the same time, it may also be known that during the relative rotation of the first body 110 and the second body 120, the first body 110 contacts one or the other of the two surfaces (surface S1 and surface S2) and is in two extreme position states which will be further described later.

Figure 3:
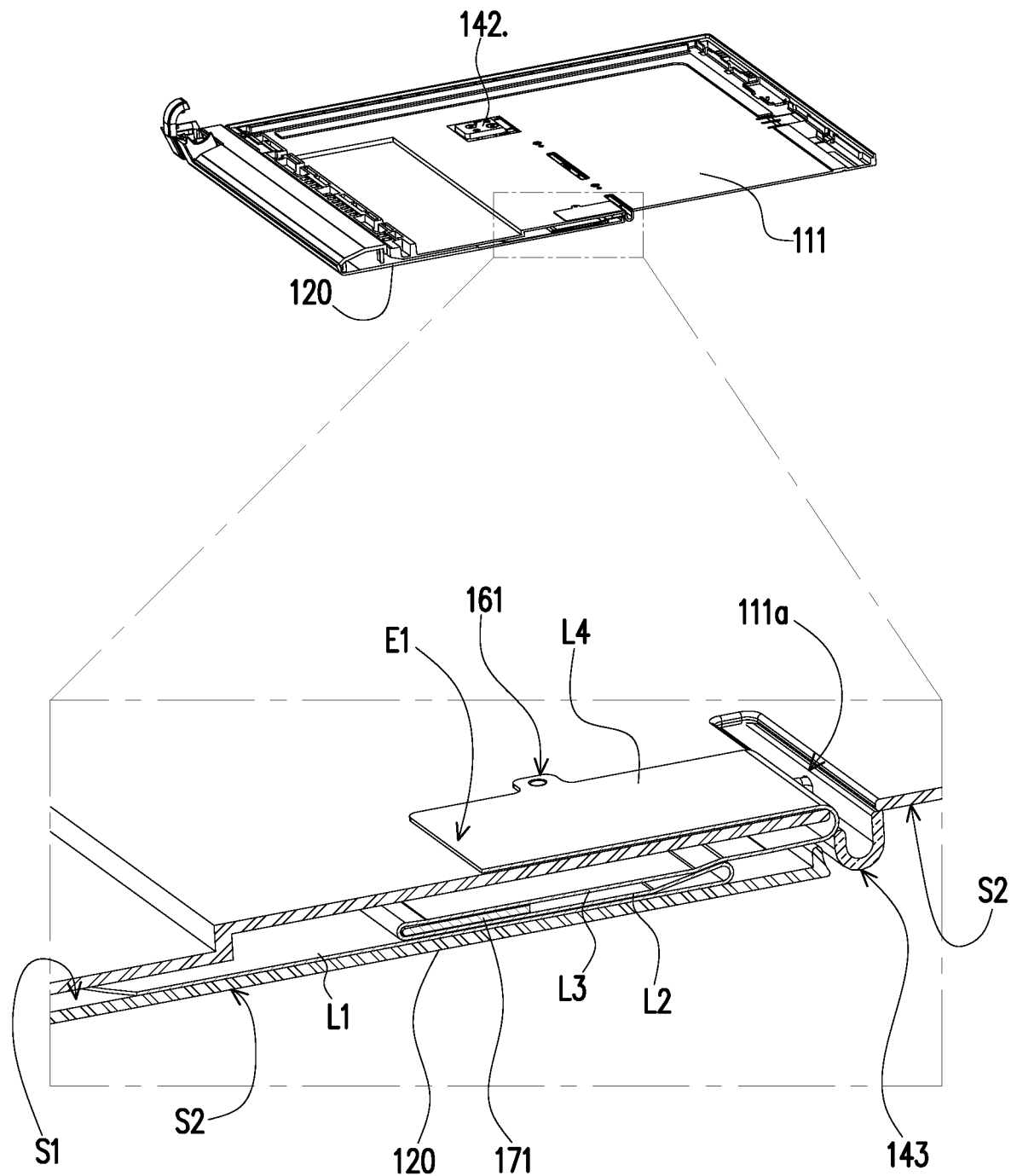
FIG. 3 is a cross-sectional view of some components of the foldable electronic device of FIG. 1.
Figure 4A:
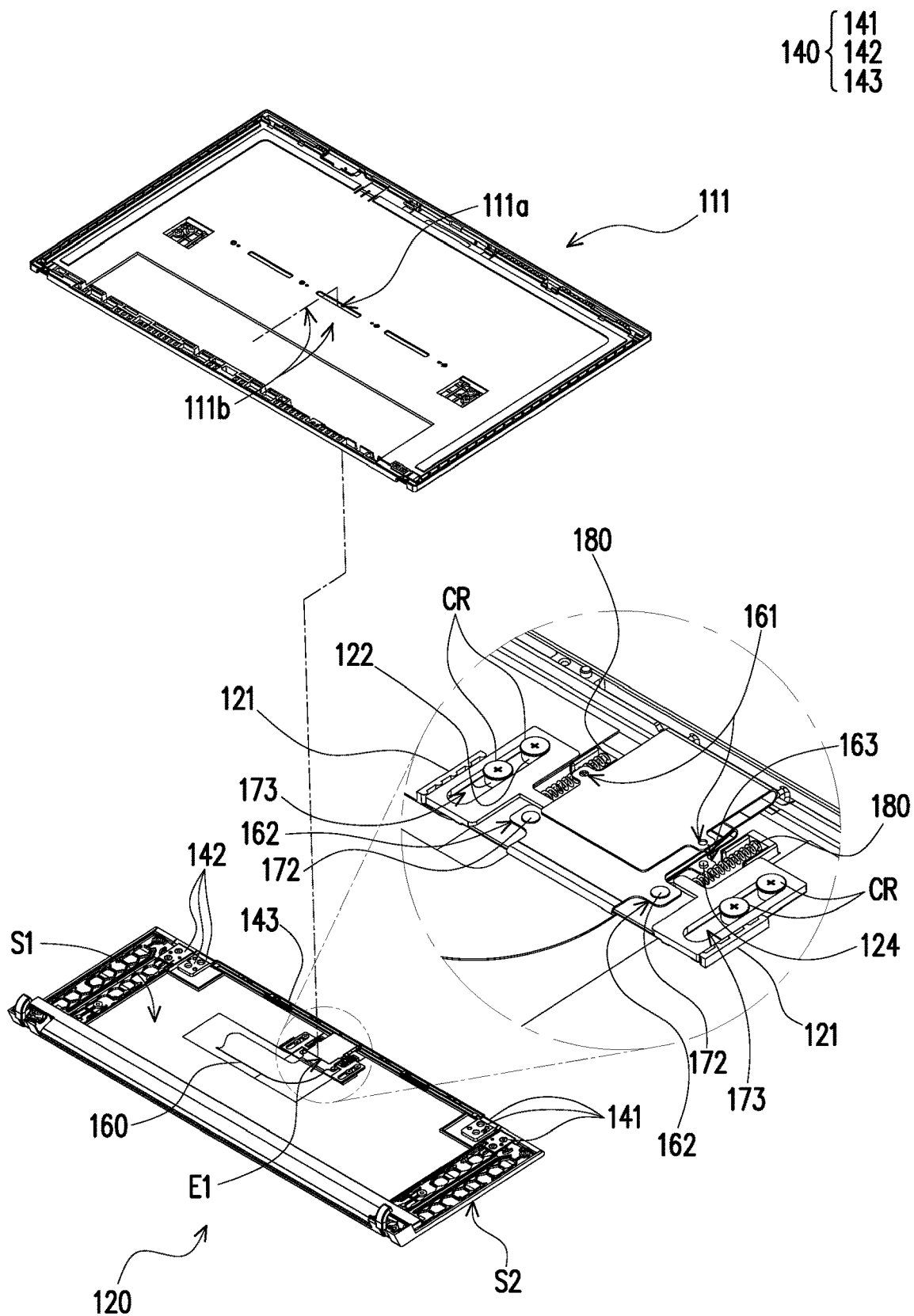
FIG. 4A and FIG. 4B respectively shows the foldable electronic device of FIG. 1 disassembled in different degrees.
Figure 4B:
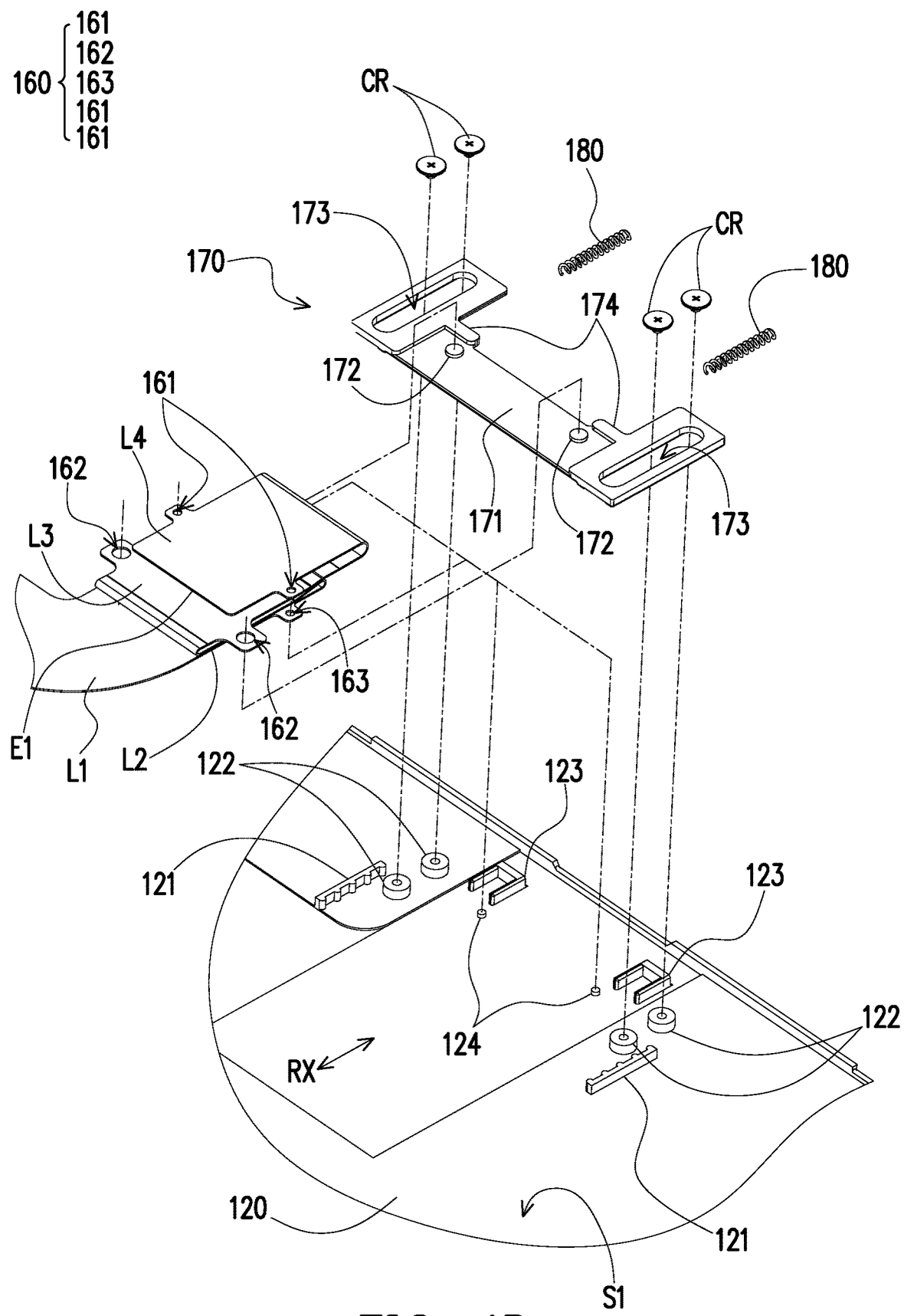

FIG. 3 is a cross-sectional view of some components of the foldable electronic device of FIG. 1. FIG. 4A and FIG. 4B respectively shows the foldable electronic device of FIG. 1 disassembled in different degrees. Please refer to FIG. 3, FIG. 4A, and FIG. 4B at the same time. The foldable electronic device 100 of the embodiment further includes a flexible electrical connecting member 160, a sliding member 170, and a restoring module. Due to the effect of the stacking of the components, a complete illustration of the sliding member 170 is only provided in FIG. 4B. Here, the sliding member 170 is movably disposed in the second body 120. The restoring module of the embodiment is, for example, a spring 180, disposed in the second body 120 and abuts between the second body 120 and the sliding member 170. Furthermore, the flexible electrical connecting member 160 (e.g., a flexible printed circuit (FPC)) is electrically connected between the first body 110 and the third body 130 and passes through the second body 120. Therefore, in order to prevent the relative movement between the first body 110 and the second body 120 (e.g., as shown in FIG. 2B and FIG. 2C) from pulling the flexible electrical connecting member 160 or causing the excess parts to be clamped by the body, the flexible electrical connecting member 160 of the embodiment structurally needs to be connected to the first body 110, the second body 120, and the sliding member 170 at the same time. A part of the flexible electrical connecting member 160 needs to form multiple stacks L1 to L4 at the above-mentioned components to be able to be driven by the relative movement of the first body 110 and the second body 120.

In detail, as shown in FIG. 4B, a rail 121, a guiding column 122, an abutting groove 123, and a positioning column 124 is disposed on the surface S1 of the second body 120. These structures are disposed in pairs to facilitate the constraint of the sliding member 170 therein. However, the to and fro movement margin of the uniaxial direction RX is maintained. Correspondingly, the sliding member 170 includes a main board 171, a positioning column 172 located on the main board 171, a guiding groove 173 located on the two opposite side wings of the main board 171, and an abutting convex portion 174 extending from the two opposite side wings to the main board 171. Furthermore, the foldable electronic device 100 further includes multiple screws CR. The multiple screws CR respectively pass through the guiding groove 173 and are locked to the guiding column 122, so as to constrain the sliding member 170 on the surface S1 of the second body 120 to move with the pairing of the guiding column 122 and the guiding groove 173. At the same time, the side surface of the two opposite side wings of the sliding member 170 also abuts on the rail 121 to achieve the effect of moving along the uniaxial direction RX as described above. As shown in FIG. 4B, the rail 121 abuts against the two opposite sides of the sliding member 170 with multiple convex structures, so as to reduce the friction force between the components to facilitate sliding by reducing the contact area.

In addition, the spring 180 abuts between the abutting groove 123 and the abutting convex portion 174. Here, please refer to FIG. 4A. The spring 180 essentially provides an elastic force toward the lower left, that is, when the sliding member 170 is under the force to move toward the upper right, the spring 180 is deformed and the elastic force is accumulated, such that when the sliding member 170 is no longer under the force, the elastic force may push the sliding member 170 back to achieve the desired restoring effect. In other words, the restoring module is used to provide the flexible electrical connecting member 160 with the restoring force opposite to the stretching direction, so as to ensure that the part of the flexible electrical connecting member 160 being stretched out of the body due to the rotation of the body (the first body 110 is rotated relatively to the second body 120 along the axis X1) may be restored to the initial state (the first body 110 and the second body 120 are retracted) when the flexible electrical connecting member 160 is no longer being stretched by the body.

It should be further explained that the flexible electrical connecting member 160 of the embodiment also needs to correspond to the relative position of the first body 110, the relative position of the second body 120, and the relative position of the sliding member 170 to be partially folded and stacked. As shown in FIG. 3, FIG. 4A, and FIG. 4B, it may be clearly seen that after passing through an opening 111a of a rear case 111 of the first body 110, an end E1 of the flexible electrical connecting member 160 is further folded into the first body 110, and a positioning portion 161 (the ear portion and the opening structure) of the flexible electrical connecting member 160 adjacent to the end portion E1 is positioned on a positioning column 111b in the first body 110. At the same time, the part where the flexible electrical connecting member 160 is folded into the first body 110 is defined as stack four L4. Here, the other end of the flexible electrical connecting member 160 enters the third body 130 (to be electrically connected to the host system in the third body 130) after passing through the second body 120.

In addition, other parts of the flexible electrical connecting member 160 are respectively bent around the first body 110, the sliding member 170, and the second body 120 to form the other stack one L1, stack two L2, and stack three L3, successively. The stack one L1 is adjacent to the surface S1 of the second body 120. The stack one L1 is bent and folded after passing below the sliding member 170 and passes below the sliding member 170 again to form the stack two L2. Next, the flexible electrical connecting member 160 is bent again and passes above the sliding member 170 to form the stack three L3, and then is bent again and folded into the first body 110 to form the stack four L4. In addition, the flexible electrical connecting member 160 has a positioning portion 163 located on the stack one L1 to position (fix) the positioning column 124 of the second body 120. The flexible electrical connecting member 160 also has a positioning portion 162 located on the stack three L3 to position (fix) the positioning column 172 of the sliding member 170. In other words, among the stack one L1 to the stack four L4, only the stack two L2 does not have the above-mentioned positioning portion. Therefore, the stack two L2 is used as the movable part of the flexible electrical connecting member 160, so as to respond to the stretching situation caused by the relative movement of the first body 110 and the second body 120, which will be further described later.

It should be noted that FIG. 3, FIG. 4A, and FIG. 4B only retain the rear case 111 and omit the partial structure of the first body 110, so as to facilitate inspection of the state where the flexible electrical connecting member 160 is being folded into the first body 110. At the same time, the stack one L1 to the stack four L4 marking the flexible electrical connecting member 160 are collectively marked in FIG. 3.

Figure 5A:
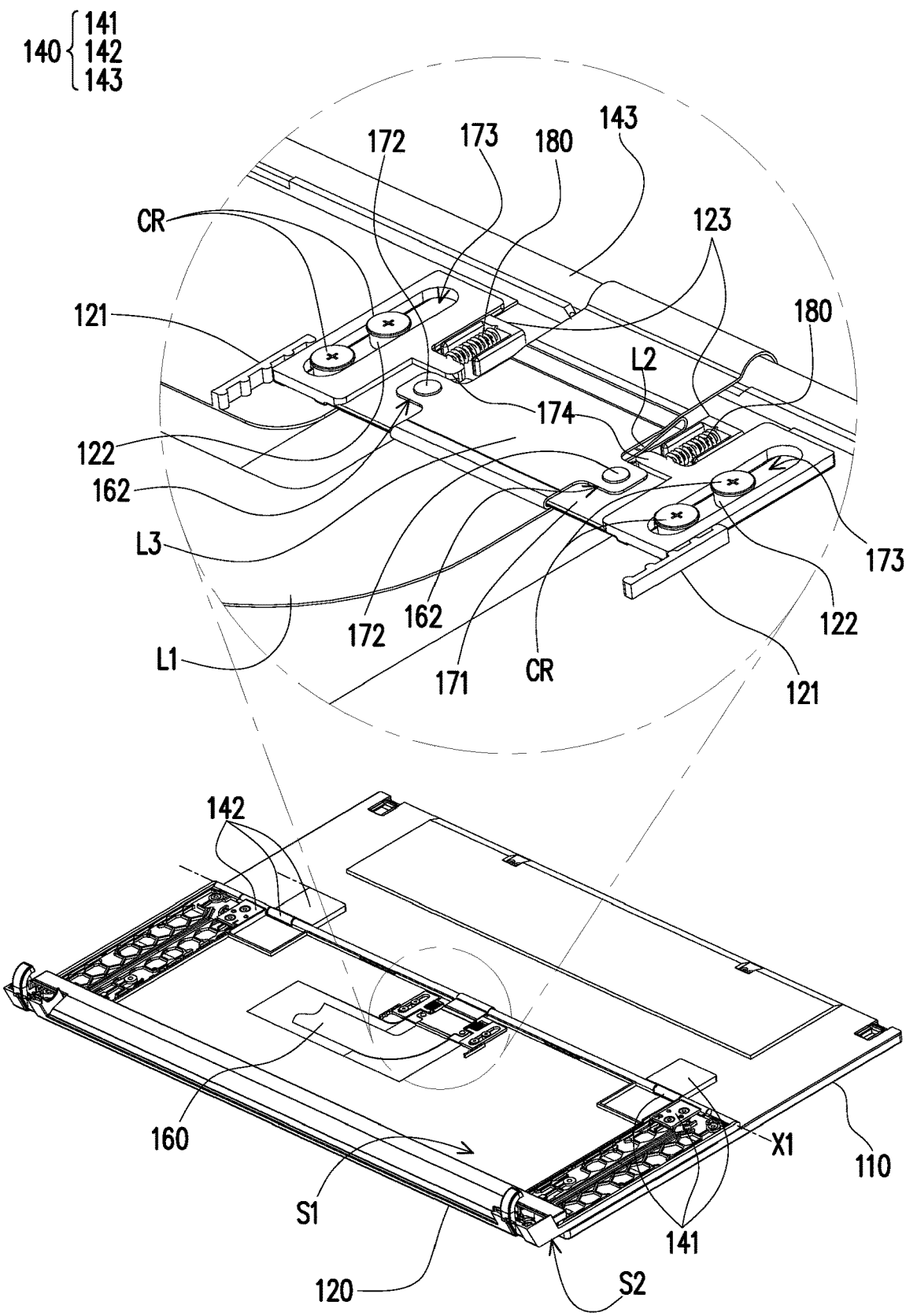
FIG. 5A to FIG. 5C are different partial schematic views of a foldable electronic device in another state.
Figure 5B:
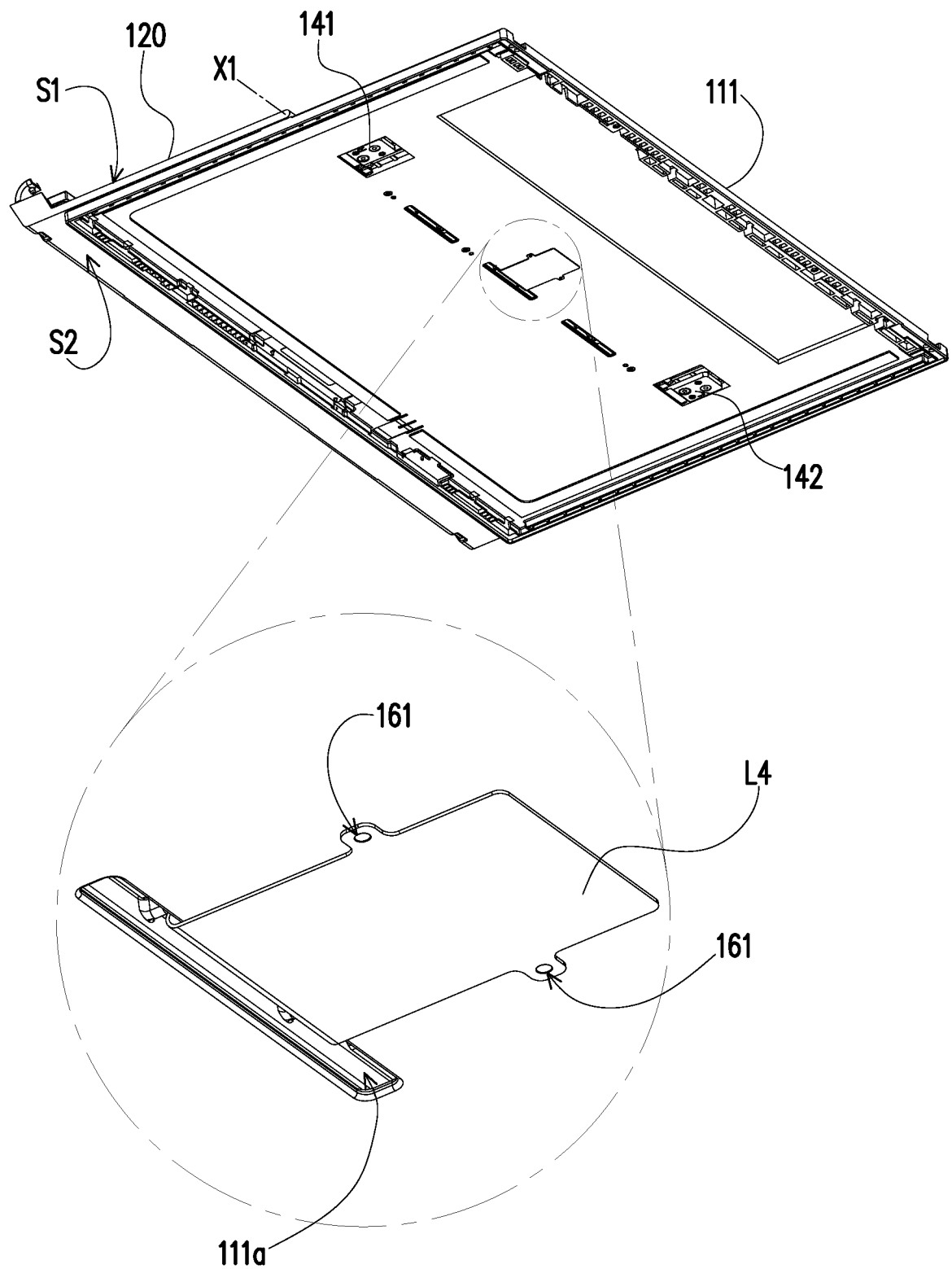
Figure 5C:
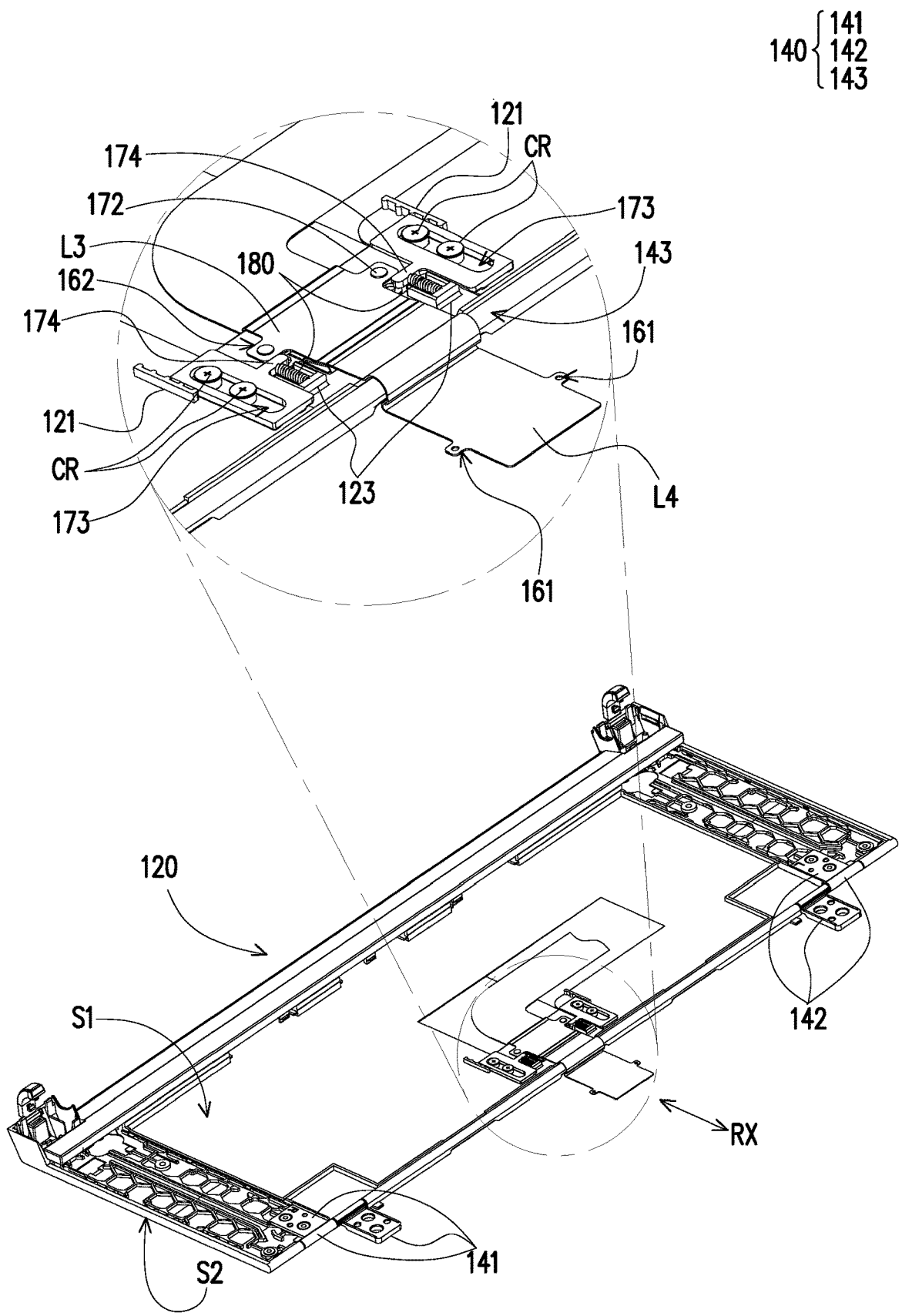
Figure 6:
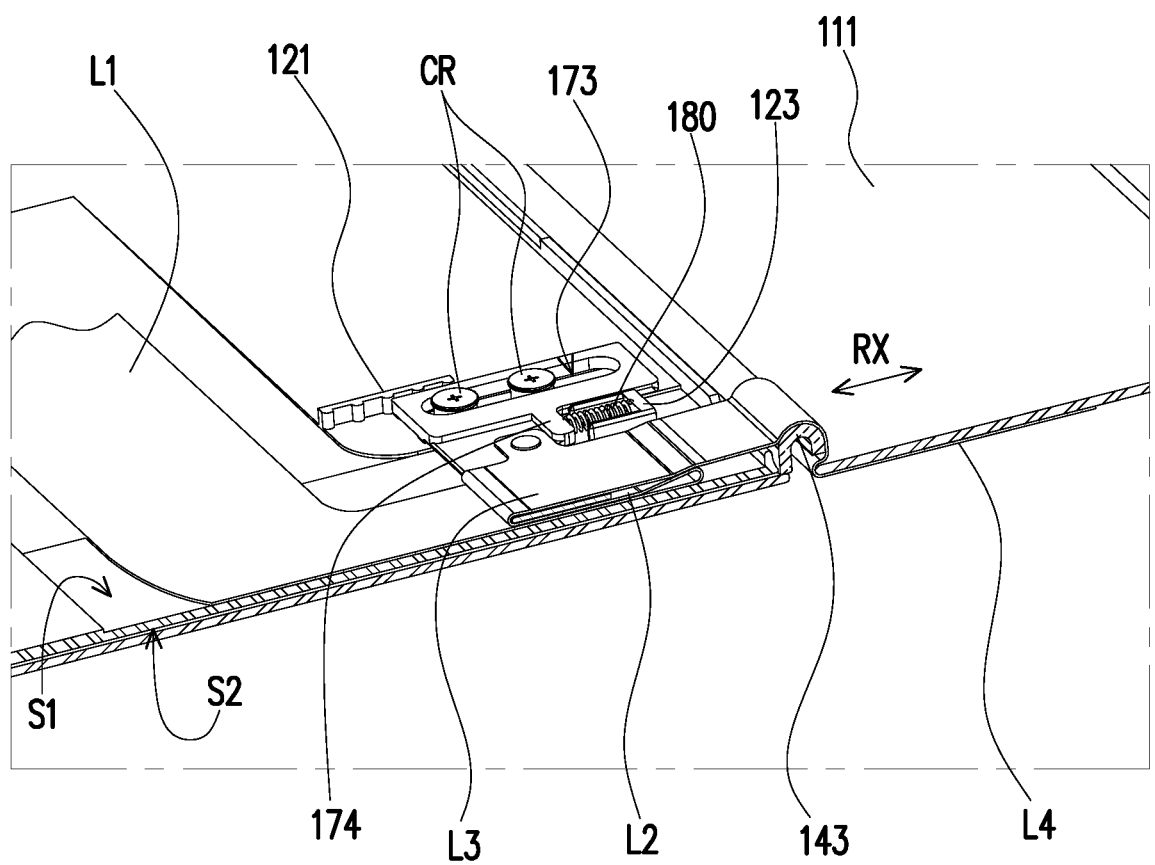
FIG. 6 is a partial cross-sectional view of a foldable electronic device in another state.

FIG. 5A to FIG. 5C are different partial schematic views of a foldable electronic device in another state. Compared with FIG. 3, FIG. 4A, and FIG. 4B, which correspond to the state shown in FIG. 2A or FIG. 2B, FIG. 5A to FIG. 5C correspond to the state shown in FIG. 2C. That is, at this time, the first body 110 has been flipped by 180 degrees from the surface S1 of the second body 120 to the surface S2 of the second body 120 through the hinge module 140. FIG. 6 is a partial cross-sectional view of a foldable electronic device in another state.

Please refer to FIG. 5A to FIG. 5C first. Due to the connection relationship of the flexible electrical connecting member 160 with respect to the first body 110, the second body 120, and the sliding member 170, when the first body 110 is being flipped, it is equivalent to the stack four L4 being flipped with the first body 110. However, since the flexible electrical connecting member 160 needs to bypass a hinge cover 143 when being flipped, the remaining part of the flexible electrical connecting member 160 is being stretched accordingly, which is equivalent to the flexible electrical connecting member 160 shown in FIG. 4B stretching toward the upper right (along the uniaxial direction RX), or stretching the other stack one L1 to stack three L3 toward the lower right along the uniaxial direction RX as shown in FIG. 5C. Further, please refer to FIG. 6 and compare with FIG. 3. The difference of the flexible electrical connecting member 160 before and after the first body 110 is flipped may be known.

However, as mentioned above, the stack one L1 and the stack three L3 are respectively positioned on the second body 120 and the sliding member 170. The stack two L2 is movable, so the stretching of the flexible electrical connecting member 160 actually only causes the stack three L3 and the stack two L2 to change. For the stack two L2, the length may be adjusted movably. For the stack three L3, the sliding member 170 is driven by the stack three L3 being stretched and moved. Please refer to FIG. 5A and FIG. 5C and compare with FIG. 4A (or please refer to FIG. 6 and compare with FIG. 3) to understand the conversion of the position of the sliding member 170. In this way, the movement of the sliding member 170 on the second body 120 further deforms (compresses) the spring 180 due to the movement of the abutting convex portion 174 toward the abutting groove 123. At this time, the flexible electrical connecting member 160 passes through and surrounds the hinge cover 143 of the hinge module 140, which may correspond to the plate-like state shown in FIG. 2B and is one of the two extreme position states.

At this point, the corresponding transformation (stretching) of the flexible electrical connecting member 160 caused by the flipping of the first body 110 relative to the second body 120 from the surface S1 to the surface S2 may be understood. At the same time, due to the corresponding relationship of the sliding member 170 and the spring 180, when the first body 110 is flipped from the surface S2 of the second body 120 back to the surface S1 again, the elastic force of the spring 180 drives the sliding member 170 to restore. The restore stroke is also equivalent to restoring the last stretched part of the flexible electrical connecting member 160 (stack two L2 and stack three L3), so as to prevent the excess parts to be formed outside the first body 110 and the second body 120 by the flexible electrical connecting member 160. That is, the excess parts are prevented from being clamped by the first body 110 and the second body 120 which may easily cause circuit damage thereon.

Conversely, without the sliding member 170 and the spring 180 of the embodiment, the stack two L2 and the stack three L3 partially protrude out of the first body 110 and the second body 120 after being stretched, the same as the previous "excess parts," and remain outside and easily clamped by the body when the first body 110 restores to the surface S1 of the second body 120. Accordingly, in the embodiment, through the pairing of the flexible electrical connecting member 160 with the sliding member 170 and the restoring module (spring 180), the flexible electrical connecting member 160 always has the capability of restoring to the "initial state" of FIG. 1, FIG. 2A, FIG. 2C, FIG. 3, FIG. 4A, or FIG. 4B, thereby effectively responding to the relative movement of the first body 110 and the second body 120 and restoring the stretching effect caused on the flexible electrical connecting member 160. In addition, it may be known from the force of the flexible electrical connecting member 160 and the corresponding changes that the folding directions of the stack one L1 to the stack four L4 are in the same direction or opposite to the driving direction of the flexible electrical connecting member 160 (for example, the uniaxial direction RX).

Figure 7:
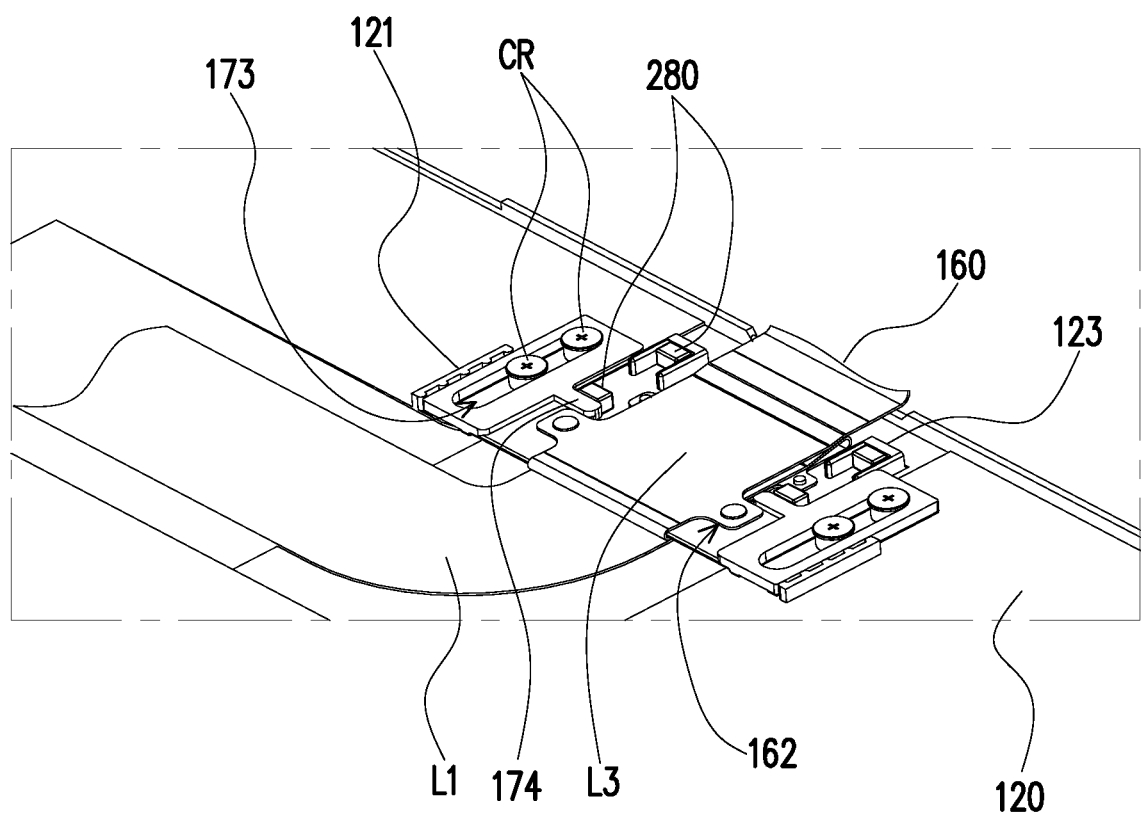
FIG. 7 is a schematic view of some components of a foldable electronic device according to another embodiment of the disclosure.

FIG. 7 is a schematic view of some components of a foldable electronic device according to another embodiment of the disclosure. Please refer to FIG. 7. Different from the spring 180 of the previous embodiment, the restoring module of the embodiment is a pair of magnetic members 280 with the same magnetic properties. One of the pair of the magnetic members 280 is disposed in the abutting groove 123, and the other of the pair of magnetic members 280 is disposed in the abutting convex portion 174 to move with the abutting convex portion 174. In this way, the magnetic repulsion force is generated when the magnetic members 280 with the same magnetic properties are close to each other, which is equivalent to the elastic force generated by the spring 180, thereby achieving the desired restoring effect on the sliding member 170. In another embodiment not shown, the other magnetic member abutting against the abutting convex portion 174 may also be movably disposed in the second body 120 to be pushed only by the abutting convex portion 174. For example, a concave space is disposed in the second body 120 to accommodate and limit the other magnetic member, so that the other magnetic member may be abutted against the abutting convex portion 174 and be prevented from falling off from the second body 120.

Figure 8:
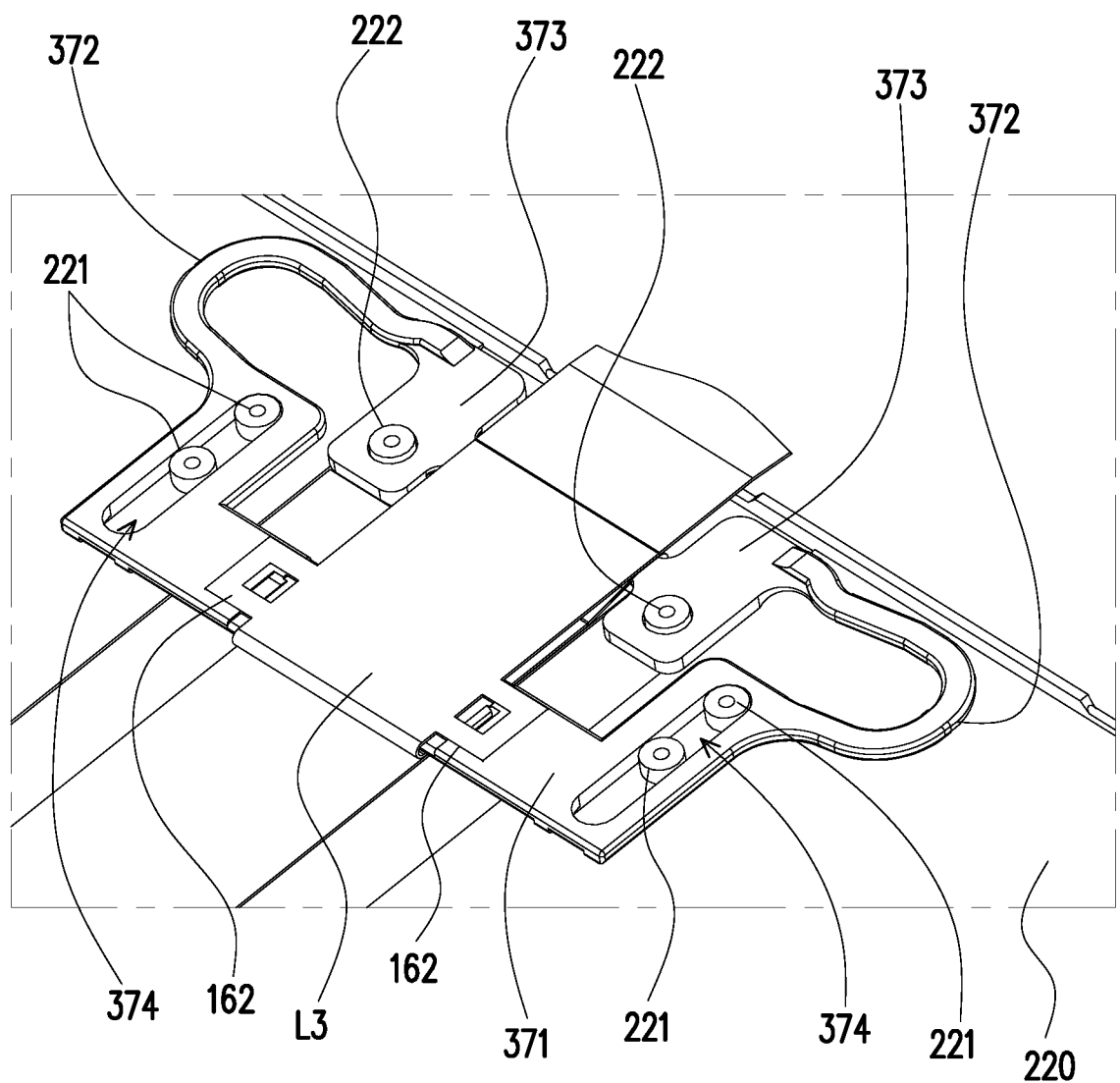
FIG. 8 is a schematic view of some components of a foldable electronic device according to another embodiment of the disclosure.

FIG. 8 is a schematic view of some components of a foldable electronic device according to another embodiment of the disclosure. Please refer to FIG. 8. Different from the previous embodiment, the embodiment is equivalent to combining the sliding member 170 and the restoring module into an integral structure, as shown in a sliding member 370 of FIG. 8 which includes a main board 371, an elastic arm 372, a fixed portion 373, and a sliding groove 374. A second body 220 has a positioning column 222 and a guiding column 221. The fixed portion 373 is fixed and positioned on the positioning column 222. The sliding groove 374 is coupled to the guiding column 221. More importantly, the elastic arm 372 is structurally connected between the fixed portion 373 and the main board 371. The main board 371 is slidably disposed on the second body 220.

Furthermore, the embodiment also omits the screws CR as in the previous embodiment. The screws CR are used to lock to the positioning column 222 and the guiding column 221 to limit the sliding member 370 on the second body 220. In addition, the embodiment also omits a retaining member. The retaining member is used to retain the second body 220 to fix the positioning portion 162 of the flexible electrical connecting member 160 on the two opposite sides of the stack three L3.

In this way, the sliding member 370 is no longer the sliding member 170 of the previous embodiment but has both sliding and restoring functions by integrating the sliding member 170 and the restoring module. In other words, the main board 371 of the embodiment is driven when the flexible electrical connecting member 160 is being stretched. Accordingly, the main board 371 is being moved toward the fixed portion 373 to deform the elastic arm 372. Therefore, when the flexible electrical connecting member 160 is not being stretched, the main board 371 (and the flexible electrical connecting member 160) may be driven to restore by the elastic force accumulated by the elastic arm 372, and the restoring effect is the same as the restoring effect of the previous embodiment.

To sum up, in the aforementioned embodiments of the disclosure, through the pairing of the flexible electrical connecting member with the sliding member and the restoring module, the foldable electronic device provides the flexible electrical connecting member with a reverse balance force during stretching, so that the flexible electrical connecting member may be restored after being stretched. Further, a part of the flexible electrical connecting member connects the first body, the second body, and the sliding member, respectively, so that when the first body and the second body are rotated relatively, the flexible electrical connecting member is driven together to stretch out of the body. At this time, in order to prevent the flexible electrical connecting member from being incapable of being retracted into the body after being stretched, the sliding member and the restoring module are used. Accordingly, when not under the force, the part of the flexible electrical connecting member remaining outside the body may be retracted into the body by the sliding member and the restoring structure, so as to avoid the situation of the part being remained outside and clamped by the body.

What is claimed is:

1. A cabling structure of a foldable electronic device, comprising:
    a first body;
    a second body;
    a hinge module, connecting the first body and the second body, wherein the first body and the second body are rotated relatively to each other through the hinge module;
    a sliding member, movably disposed in the second body;
    a flexible electrical connecting member, connecting the first body, the second body, and the sliding member so as to be driven when the first body and the second body are rotated relatively to each other;
    a restoring module, disposed in the second body and providing a force to the sliding member, wherein the first body and the second body are rotated relatively to drive the flexible electrical connecting member and the sliding member, and the restoring module restores the sliding member and the flexible electrical connecting member via the force,
    wherein a part of the flexible electrical connecting member forms a plurality of stacks in the first body and the second body, and three of the stacks are respectively positioned on the second body, the sliding member, and the first body,
    wherein the stacks comprise a stack one adjacent to the second body and passing between the sliding member and the second body, a stack two reversely folded and extending from the stack one and passing between the sliding member and the second body, a stack three reversely folded and extending from the stack two and passing above the sliding member, and a stack four extending from the stack three and moving into the first body, wherein the stack one is fixed on the second body, the stack three is fixed on the sliding member, and the stack four is fixed on the first body,
    wherein the stack one is folded by itself over the stack two without folding around any other component.

2. The cabling structure of the foldable electronic device according to claim 1, wherein folding directions of the stacks are in the same direction or opposite to a driving direction of the flexible electrical connecting member.

3. The cabling structure of the foldable electronic device according to claim 1, wherein the sliding member has a main board, at least one guiding groove, and at least one abutting convex portion, the second body has a rail and at least one guiding column, the main board is slidably coupled to the rail, and the guiding column is slidably coupled to the guiding groove.

4. The cabling structure of the foldable electronic device according to claim 3, wherein the restoring module is a spring abutting between the abutting convex portion and an abutting groove of the second body.

5. The cabling structure of a foldable electronic device according to claim 1, wherein the restoring module is a pair of magnetic members with the same magnetic properties respectively disposed in the second body and the sliding member.

6. The cabling structure of the foldable electronic device according to claim 1, wherein the restoring module and the sliding member are an integral structure which has a main board movably disposed in the second body, a fixed portion fixed on the second body, and an elastic arm connected between the fixed portion and the main board.

7. The cabling structure of the foldable electronic device according to claim 1, wherein the hinge module comprises a pair of hinges and a hinge cover located between the pair of hinges, each of the pair of hinges connects the first body and the second body, and the flexible electrical connecting member passes through the hinge cover.

8. The cabling structure of the foldable electronic device according to claim 1, further comprising a third body, the hinge module connected the second body and the third body, and the second body and the third body rotated relatively through the hinge module to be opened or closed,
    wherein the flexible electrical connecting member is connected between the first body and the third body by passing through the second body,
    wherein the second body has two surfaces relative to each other, the first body contacts one or the other of the two surfaces and is at two extreme position states during a relative rotation of the first body and the second body, and the flexible electrical connecting member passes through and surrounds a part of a hinge cover in one of the two extreme position states, wherein the first body is stacked between the second body and the third body in one of the two extreme position states, and the second body is stacked between the first body and the third body in the other one of the two extreme position states.

* * * * *